United States Patent
Cornes

(10) Patent No.: US 11,305,872 B2
(45) Date of Patent: Apr. 19, 2022

(54) RETRACTABLE PROPULSOR ASSEMBLIES FOR VERTICAL TAKE-OFF AND LANDING (VTOL) AIRCRAFT

(71) Applicant: The Aurora Flight Sciences Corporation, Manassas, VA (US)

(72) Inventor: Olivier Cornes, Zurich (CH)

(73) Assignee: Aurora Flight Sciences Corporation, Manassas, VA (US)

( * ) Notice: Subject to any disclaimer, the term of this patent is extended or adjusted under 35 U.S.C. 154(b) by 322 days.

(21) Appl. No.: 16/524,547

(22) Filed: Jul. 29, 2019

(65) Prior Publication Data
US 2021/0031910 A1    Feb. 4, 2021

(51) Int. Cl.
*B64C 29/00* (2006.01)
*B64C 1/14* (2006.01)
(Continued)

(52) U.S. Cl.
CPC .......... *B64C 29/0033* (2013.01); *B64C 1/14* (2013.01); *B64C 25/04* (2013.01); *B64C 27/30* (2013.01); *B64C 29/0025* (2013.01)

(58) Field of Classification Search
CPC ... B64C 29/0033; B64C 29/0025; B64C 1/14; B64C 25/04; B64C 27/30; B64C 2201/102; B64C 25/10; B64C 25/12; B64C 2025/125; B64C 29/0016; B64C 29/0091; B64C 29/02; B64C 11/28; B64C 11/48; B64C 27/50
See application file for complete search history.

(56) References Cited

U.S. PATENT DOCUMENTS 6,622,962 B1    9/2003  White
2015/0321755 A1*  11/2015  Martin ................. B64C 39/024
                                               244/17.23
(Continued)

FOREIGN PATENT DOCUMENTS

CN    106428547 A  *  2/2017
CN    106428547 A     2/2017
(Continued)

OTHER PUBLICATIONS

European Search Report; Application EP20182929; dated Dec. 15, 2020.

*Primary Examiner* — Joshua J Michener
*Assistant Examiner* — Cindi M Curry
(74) *Attorney, Agent, or Firm* — Duft & Bornsen, PC

(57) ABSTRACT

Retractable propulsor assemblies for aircraft are described that generate lift during vertical take-off, hover, and vertical landing. The retractable propulsor assemblies are deployed from a compartment in a fuselage of the aircraft to transition the aircraft into vertical flight, and are stowed in the compartment during cruise flight to reduce aerodynamic drag on the aircraft. One embodiment comprises a method of operating a VTOL aircraft. The method comprises deploying the retractable propulsor assembly from the compartment of the fuselage to provide the lift for vertical flight. The method further comprises transitioning the VTOL aircraft from the vertical flight to cruise flight, and stowing the retractable propulsor assembly in the compartment during the cruise flight to reduce the aerodynamic drag on the VTOL aircraft.

20 Claims, 14 Drawing Sheets

(51) Int. Cl.
*B64C 25/04* (2006.01)
*B64C 27/30* (2006.01)

(56) References Cited

U.S. PATENT DOCUMENTS

2018/0281933 A1* 10/2018 Davis ................... B64C 25/12
2019/0071178 A1* 3/2019 Caubel ................. B64C 1/063

FOREIGN PATENT DOCUMENTS

| CN | 206984353 | U | * | 2/2018 | ............. B64C 27/26 |
| CN | 206984353 | U | | 2/2018 | |
| CN | 110697020 | A | * | 1/2020 | |
| DE | 102012020498 | | | 4/2014 | |
| DE | 102012020498 | A1 | * | 4/2014 | ......... B64C 29/0033 |
| EP | 2669195 | A1 | * | 12/2013 | ......... B64C 29/0033 |
| EP | 2669195 | A1 | | 12/2013 | |
| RU | 2682756 | C1 | * | 3/2019 | ............... B64C 5/06 |
| RU | 2723104 | C1 | * | 6/2020 | |
| WO | WO-2019046911 | A1 | * | 3/2019 | ............. F42B 30/04 |

* cited by examiner

RETRACTABLE PROPULSOR ASSEMBLIES FOR VERTICAL TAKE-OFF AND LANDING (VTOL) AIRCRAFT

FIELD

This disclosure relates to the field of aircraft, and in particular, to VTOL aircraft.

BACKGROUND

A type of aircraft that can take off, hover, and land vertically is referred to as a VTOL aircraft. A VTOL aircraft has one or more rotors that produce vertical lift. Some VTOL aircraft also have fixed-wings that generate lift when the aircraft is propelled forward by a propeller, a jet engine, etc. When these fixed-wing aircraft convert from vertical flight to horizontal or cruise flight, the rotors are turned off. However, once the rotors are off, the rotors and any support structures associated with the rotors remain in the airflow around the aircraft, which can create drag.

SUMMARY

Retractable propulsor assemblies for aircraft are described that generate lift during vertical take-off, hover, and vertical landing. The retractable propulsor assemblies are deployed from a compartment in a fuselage of the aircraft to transition the aircraft into vertical flight, and are stowed in the compartment during cruise flight to reduce aerodynamic drag on the aircraft.

One embodiment comprises a method of operating a VTOL aircraft. The method comprises deploying a retractable propulsor assembly from a compartment of the fuselage of the VTOL aircraft to provide lift for vertical flight. The method further comprises transitioning the VTOL aircraft from the vertical flight to cruise flight, and stowing the retractable propulsor assembly in the compartment during the cruise flight to reduce the aerodynamic drag on the VTOL aircraft.

Another embodiment comprises an aircraft comprising a fuselage and a retractable propulsor assembly. The fuselage has control surfaces that provide lift during forward flight. The retractable propulsor assembly includes an arm having a first end rotatably coupled to the fuselage within a compartment in the fuselage, where the compartment houses the retractable propulsor assembly. The retractable propulsor assembly further comprises a propulsor disposed at a second end of the arm that generates lift for the aircraft. The retractable propulsor assembly further includes a drive mechanism mechanically coupled to the first end of the arm that pivots the arm out of the compartment to transition the aircraft into vertical fight, and pivots the arm into the compartment in response to the aircraft being in forward flight.

Another embodiment comprises a retractable propulsor assembly that includes an arm, a propulsor, a locking mechanism, and at least one spring biasing system. The arm has a first end rotatably coupled to a fuselage of an aircraft. The propulsor is disposed at a second end of the arm and generates lift for the aircraft. The locking mechanism selectively locks and releases the first end of the arm for rotation. The at least one spring biasing system is coupled to the first end of the arm that, responsive to the locking mechanism releasing the first end of the arm for rotation, generates a torque and pivots the second end of the arm away from the fuselage to provide, utilizing the propulsor, the lift for vertical flight.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DETAILED DESCRIPTION

Figure 1:
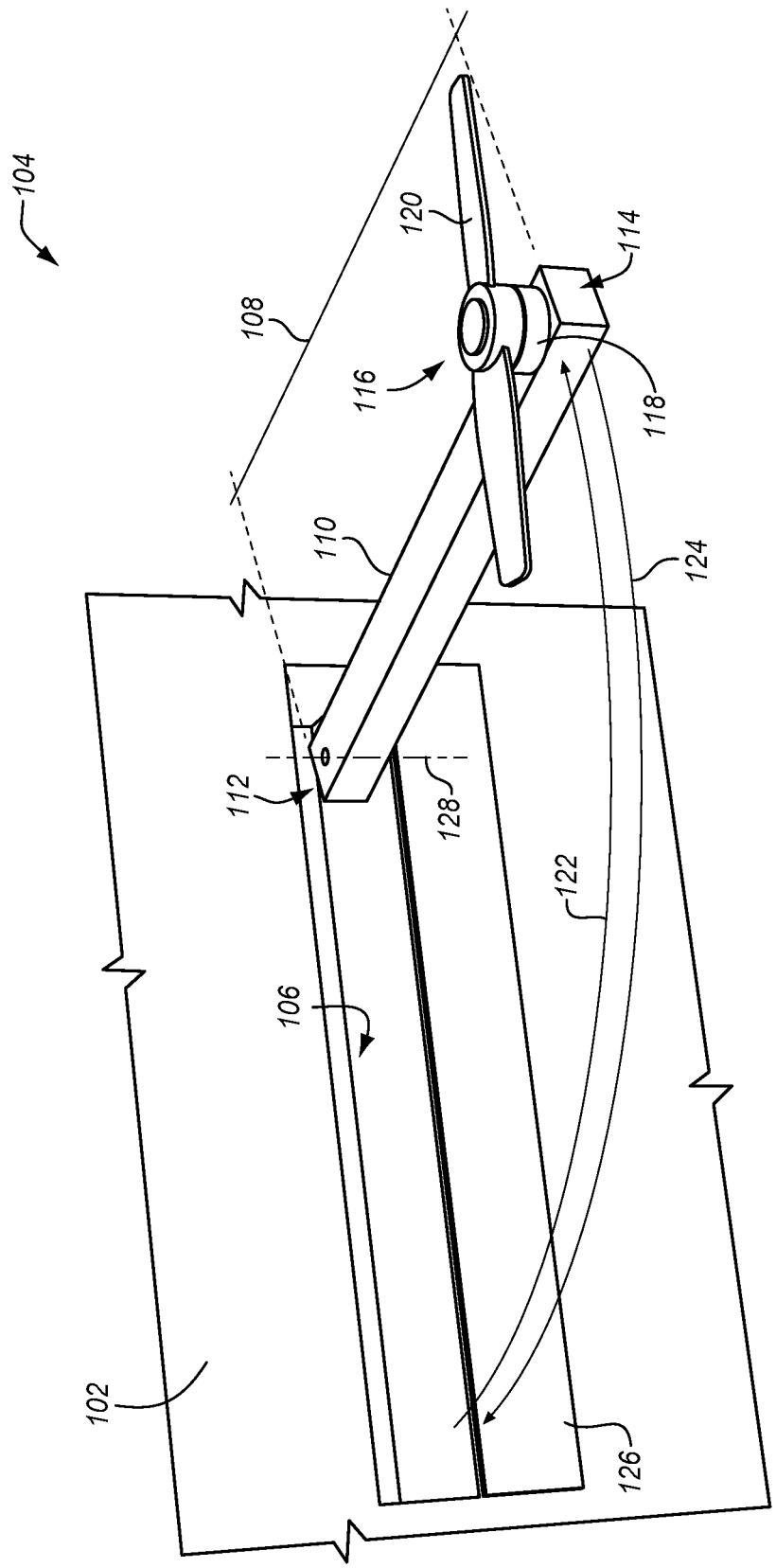
FIGS. 1-8 are isometric views of retractable propulsor assemblies for aircraft in various illustrative embodiments.

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

FIGS. 1-8 are isometric views of retractable propulsor assemblies 108 for an aircraft 104 in various illustrative embodiments. In the embodiment illustrated in FIG. 1, a fuselage 102 of aircraft 104 includes a compartment 106, which is configured to house retractable propulsor assembly 108. Retractable propulsor assembly 108 is configured to deploy from compartment 106 to provide lift to aircraft 104 for vertical flight, and to stow or retract into compartment 106 when aircraft 104 is in forward (e.g., cruise) flight.

Figure 2:
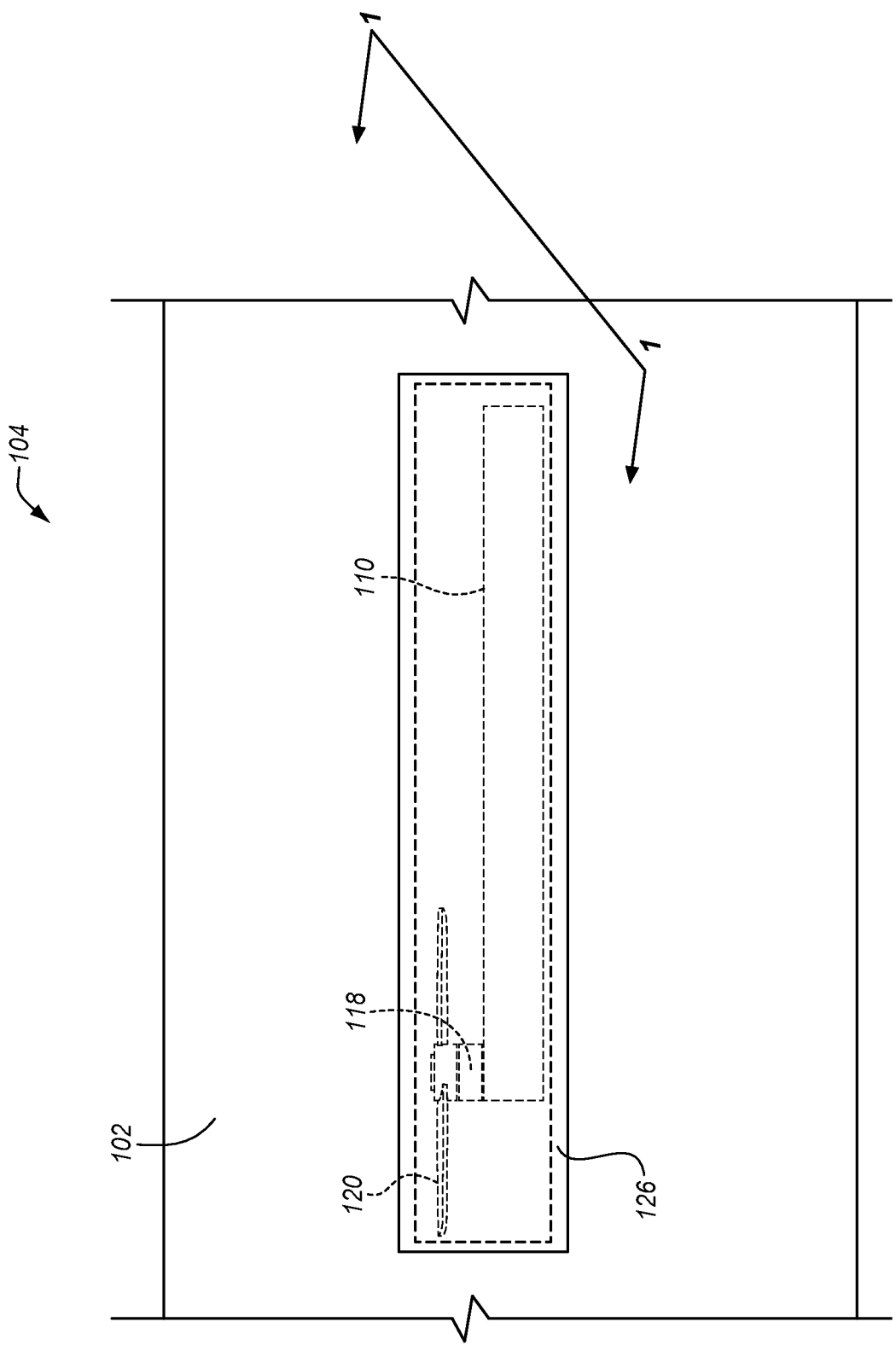

In this embodiment, retractable propulsor assembly 108 includes an arm 110 having an end 112 (i.e., a first end) rotatably attached to fuselage 102 within compartment 106 and an end 114 (i.e., a second end) distal from end 112 that supports a propulsor 116. Propulsor 116 provides lift to aircraft 104 during vertical flight operations. Propulsor 116 comprises any component, system, or device that generates vertical lift for aircraft 104. In some embodiments, propulsor 116 comprises a motor 118 and a rotor 120 as illustrated in FIG. 1, while in other embodiments, propulsor 116 comprises other combinations of reciprocating engines, turbines, one or more rotors, propellers, etc. In the deployed position illustrated in FIG. 1, propulsor 116 generates lift as aircraft 104 vertically lands, vertically takes-off, and hovers. During forward flight (e.g., cruise flight) when lift is provided by other lift generating elements (e.g., control surfaces or wings, not shown in FIG. 1), retractable propulsor assembly 108 is stowed in compartment 106 as illustrated in FIG. 2.

To deploy retractable propulsor assembly 108 as illustrated in FIG. 1, arm 110 pivots at end 112 (e.g., at axis 128)

and moves end 114 in the direction of arrow 122. To stow retractable propulsor assembly 108 as illustrated in FIG. 2, arm 110 pivots at end 112 (e.g., at axis 128) and moves end 114 in the direction of arrow 124.

In the embodiment illustrated in FIG. 1, fuselage 102 includes a door 126 that is configured to selectively cover and uncover compartment 106. Door 126 selectively uncovers compartment 106 prior to deploying retractable propulsor assembly 108 from compartment, and door 126 selectively covers compartment 106 in response to stowing retractable propulsor assembly 108 in compartment 106. The use of compartment 106 and door 126 covering compartment 106 when retractable propulsor assembly 108 is stowed provides the technical effect of minimizing aerodynamic drag on aircraft 104 while aircraft 104 is in forward flight.

In some embodiments, retractable propulsor assembly 108 is spring-biased toward the deployed position illustrated in FIG. 1. The use of spring biasing enables retractable propulsor assembly 108 to be deployed even in the case where a primary deployment system used to deploy retractable propulsor assembly 108 has failed. For example, mechanisms used to deploy retractable propulsor assembly 108 may include electric motors, hydraulic systems, pneumatic systems, etc., which may be inoperable in some cases due to failure. When inoperable, the spring biasing system is used to deploy retractable propulsor assembly 108, thereby allowing aircraft 104 to perform a vertical landing.

The torque generated by a spring biasing system (not shown in this view) to pivot retractable propulsor assembly 108 out of compartment 106 and into the deployed position illustrated in FIG. 1 is selected to overcome the opposing torque generated on retractable propulsor assembly 108 due to an airflow generated when aircraft 104 is in forward flight. This ensures that the torque generated by the spring biasing system can effectively and reliably deploy retractable propulsor assembly 108 during forward flight in case of a failure of the primary deployment system. The use of spring-biasing toward the deployed position provides a higher level of safety than relying on the primary deployment system alone.

Various latching mechanisms may be used to selectively lock retractable propulsor assembly 108 in the deployed position to prevent arm 110 from rotating at end 112, and to selectively unlock retractable propulsor assembly 108 when in the deployed position to allow arm 110 to rotate at end 112 to transition retractable propulsor assembly 108 to the stowed position illustrated in FIG. 2. The latching mechanisms may include electric actuators, hydraulic actuators, manual actuators (e.g., slidable pins), or combinations thereof. During a failure of the primary deployment system for deploying retractable propulsor assembly 108, a pilot, in one embodiment, utilizes a manual release mechanism to unlock arm 110 for rotation at end 112, thereby allowing the spring biasing system to automatically pivot retractable propulsor assembly 108 out of compartment 106. Once deployed, the pilot, in one embodiment, utilizes a manual lock mechanism to lock retractable propulsor assembly 108 in the deployed position illustrated in FIG. 1.

Figure 3:
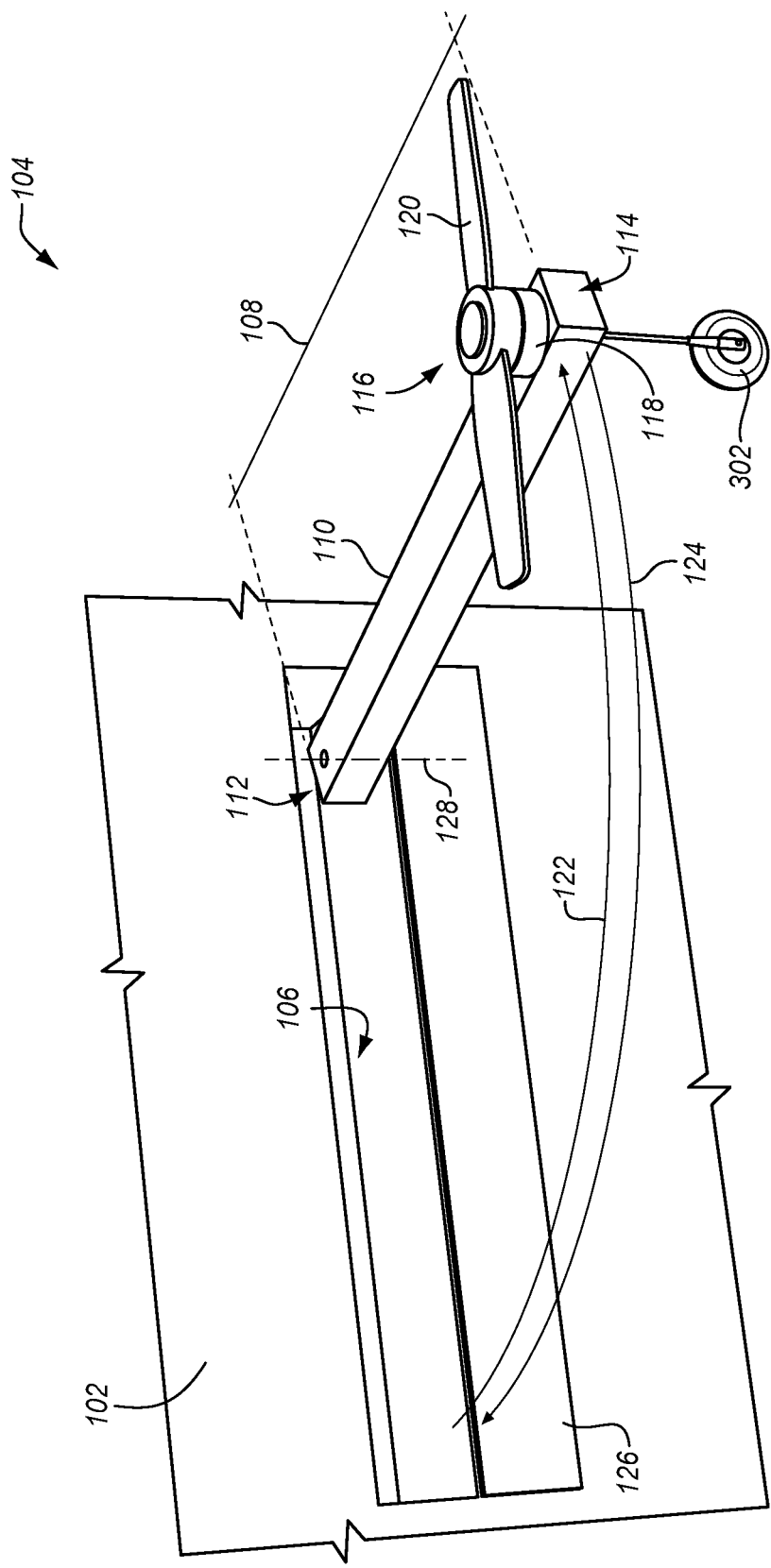

In some embodiments, retractable propulsor assembly 108 is used as landing gear 302 for aircraft 104, as illustrated in FIG. 3. In this embodiment, end 114 of retractable propulsor assembly 108 includes landing gear 302, which is configured to support fuselage 102 when aircraft 104 is on the ground. Landing gear 302 may retract into or pivot toward arm 110 as retractable propulsor assembly 108 is stowed in compartment 106 to achieve a more compact shape, and deploy out of or pivot away from arm 110 as retractable propulsor assembly 108 is deployed from compartment 106 in preparation for landing. Although the embodiment of FIG. 3 illustrates landing gear 302 as a wheel, landing gear 302 in other embodiments comprises other type of structures that contact the ground when aircraft 104 lands.

In some embodiments, retractable propulsor assembly 108 is stowed in compartment 106 in response to aircraft 104 landing in order to provide a more open path for the occupants of aircraft 104 to exit and enter aircraft 104. In these embodiments, FIG. 2 may represent the configuration of aircraft 104 while on the ground, with retractable propulsor assembly 108 stowed in compartment 106. When aircraft 104 is ready for flight operations, retractable propulsor assembly 108 is deployed as illustrated in FIG. 1 to allow aircraft 104 to perform vertical flight operations.

Figure 4:
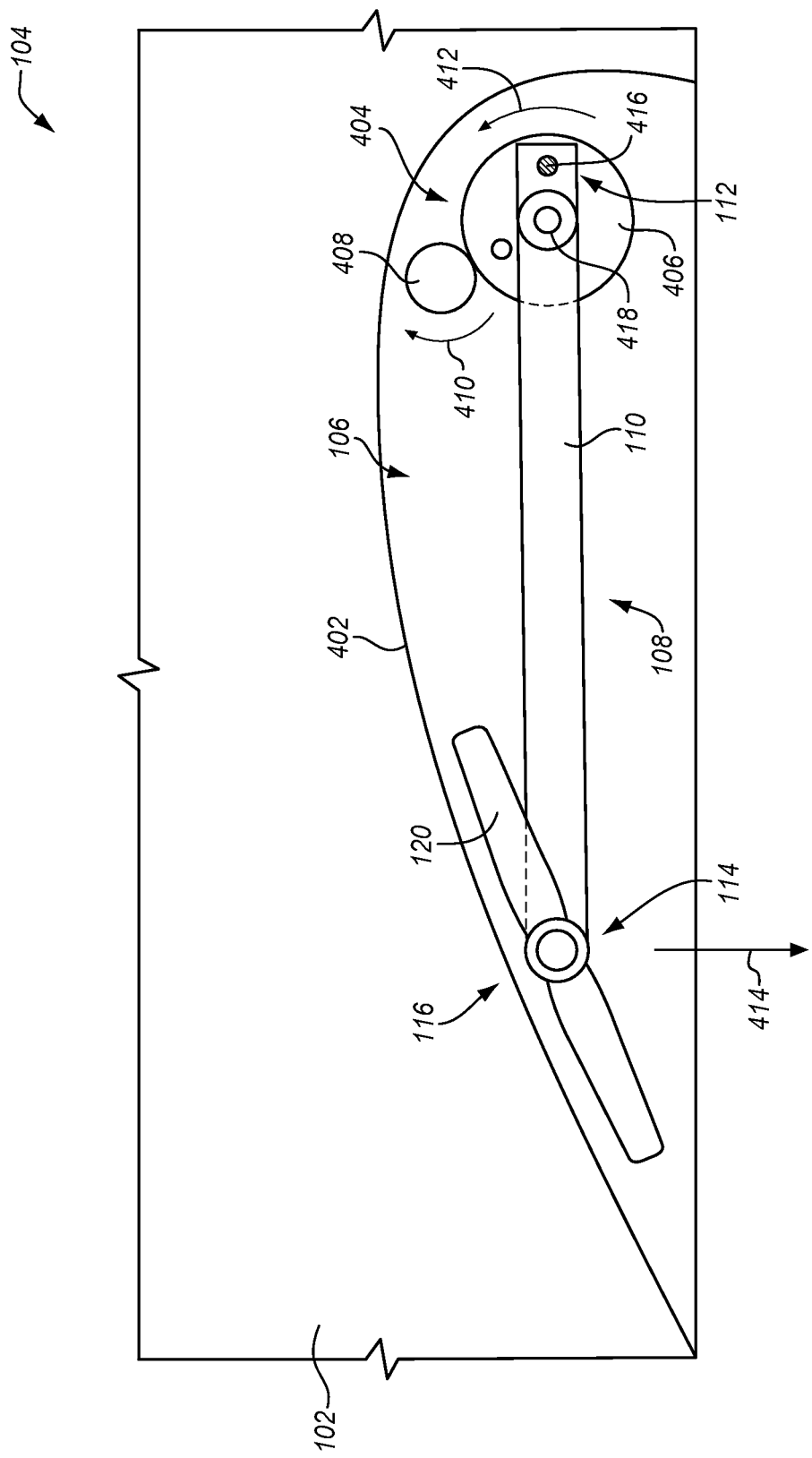
Figure 5:
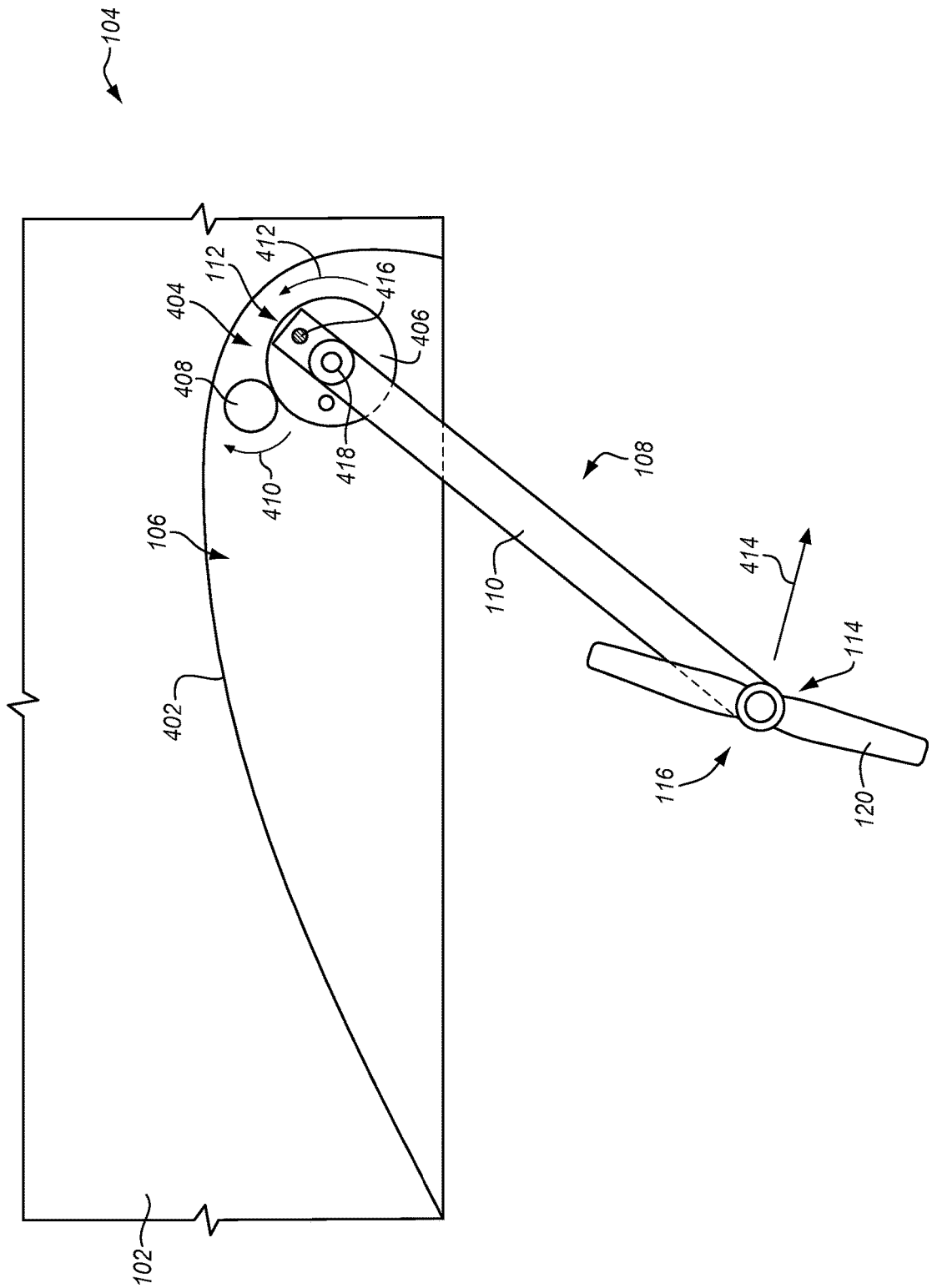
Figure 6:
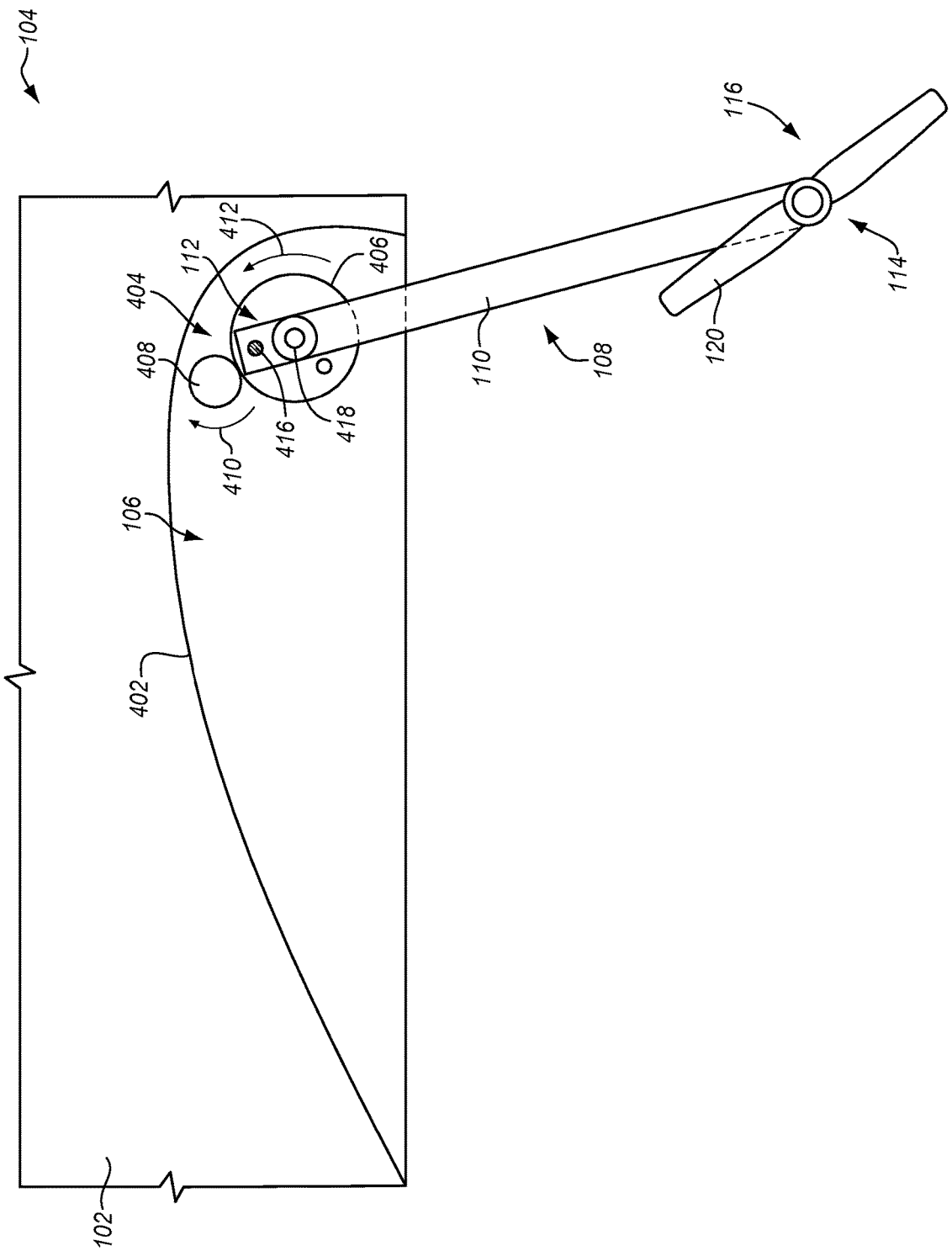
Figure 7:
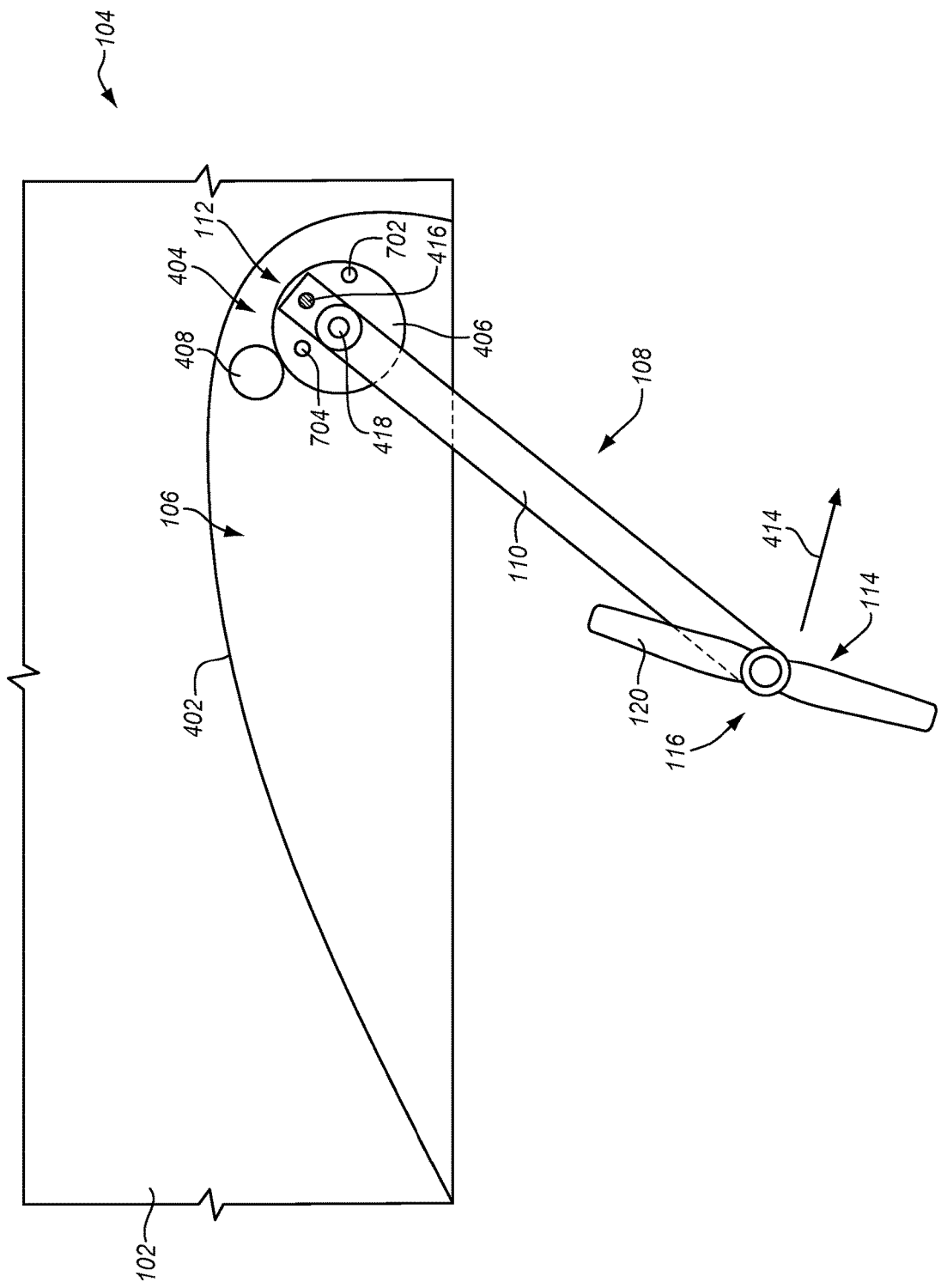
Figure 8:
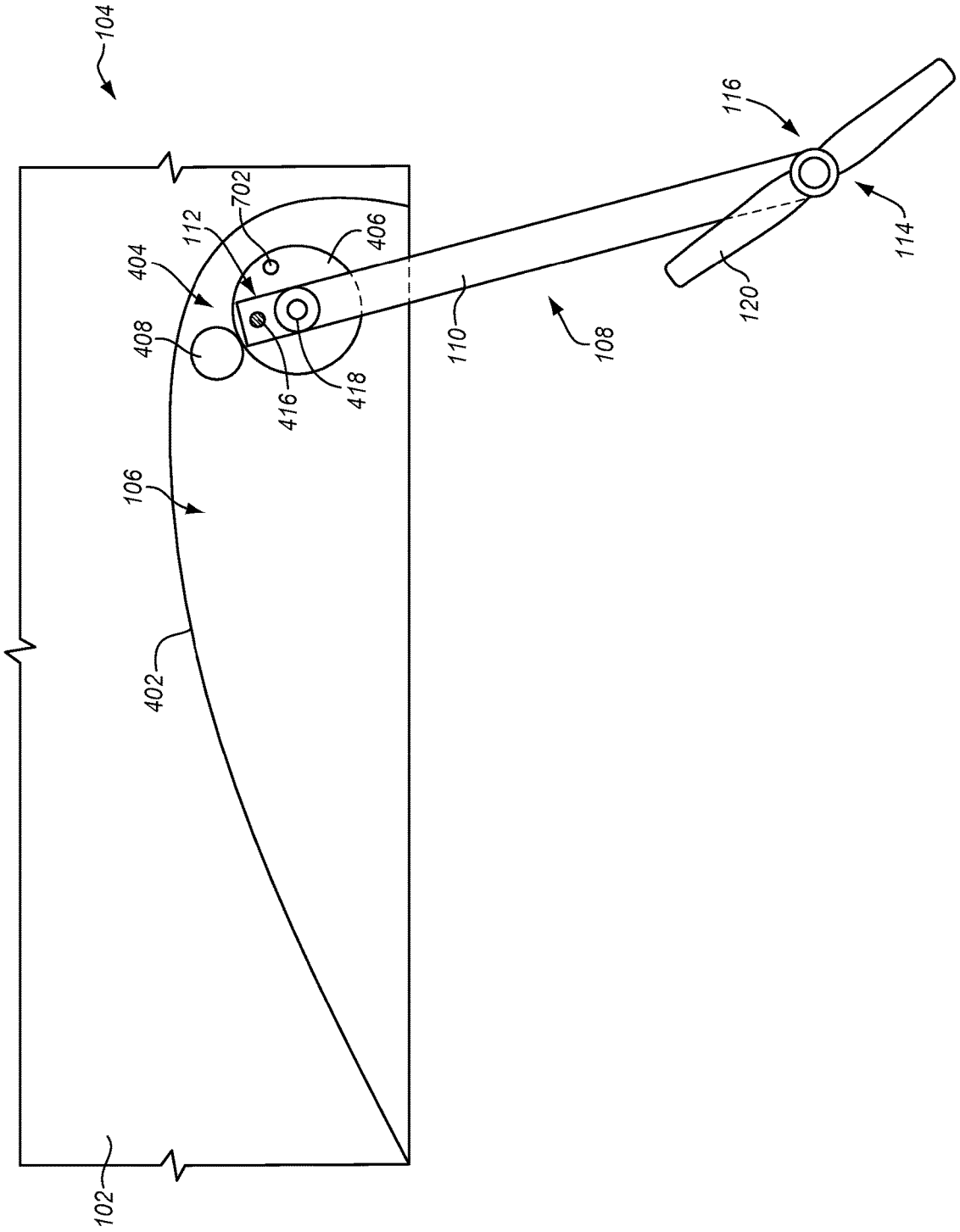

FIGS. 4-8 depict retractable propulsor assembly 108 in another illustrative embodiment. In particular, FIGS. 4-8 illustrate compartment 106 through cut lines 1-1 of FIG. 2. FIG. 4 illustrates retractable propulsor assembly 108 in the stowed position, FIGS. 5 and 7 illustrate retractable propulsor assembly 108 in an intermediate position between stowed and deployed, and FIGS. 6 and 8 illustrate retractable propulsor assembly 108 in the deployed position. Referring again to FIG. 4, retractable propulsor assembly 108 is in the stowed position. In this view, compartment 106 includes a blade guide 402, which is used to guide rotor 120 into the position illustrated in FIG. 4 as retractable propulsor assembly 108 transitions from the deployed position to the stowed position. In this embodiment of retractable propulsor assembly 108, retractable propulsor assembly 108 is mechanically driven between the stowed position and the deployed position using a primary deployment system 404. Primary deployment system 404 may be referred to as a drive mechanism in some embodiments. Primary deployment system 404 comprises any component, system, or device that transitions retractable propulsor assembly 108 between the stowed position illustrated in FIG. 2 and the deployed position illustrated in FIG. 1. Some examples of primary deployment system 404 include electric motor and gear assemblies, hydraulic actuators, pneumatic actuators, etc., which collectively comprise one or more power sources. In this embodiment, primary deployment system 404 comprises a main gear 406 that is engaged with a driving gear 408. Main gear 406 is mechanically coupled to end 112 of arm 110, and as driving gear 408 rotates in the direction of arrow 410, main gear 406 rotates in the direction of arrow 412. Driving gear 408 may be driven in rotation, for example, using an electric motor, a mechanical crank, etc. As main gear 406 rotates in the direction indicated by arrow 412, arm 110 pivots out of compartment 106, moving end 114 of arm 110 in the direction of arrow 414.

FIG. 5 illustrates retractable propulsor assembly 108 in an intermediate position between stowed and deployed, and FIG. 6 illustrates retractable propulsor assembly 108 in the deployed position. When in the deployed position, retractable propulsor assembly 108 is operated to generate lift for aircraft 104.

Referring again to FIG. 4, arm 110 is rotatably coupled to main gear 406 in this embodiment, and is held in place relative to main gear 406 by a latching mechanism 416. Latching mechanism 416 may be referred to as a locking mechanism in some embodiments. Latching mechanism 416 is illustrated as a locking pin in this embodiment. When latching mechanism 416 is released, a spring biasing system 418 generates a torque on end 112 of arm 110, pivoting end 112 of arm 110 in the direction of arrow 414 to automatically deploy retractable propulsor assembly 108 from compartment 106. Spring biasing system 418 operates independently of primary deployment system 404 to deploy retractable propulsor assembly 108, thereby ensuring that retractable propulsor assembly 108 is deployed even if main gear 406 fails to rotate. Spring biasing system 418 comprises any component, system, or device that automatically transitions retractable propulsor assembly 108 from the stowed position to the deployed position independently of primary deployment system 404. Some examples of spring biasing system 418 include pneumatic pistons, springs, spiral springs, helical torsion springs, etc.

FIG. 7 illustrates retractable propulsor assembly 108 in an intermediate position as spring biasing system 418 deploys retractable propulsor assembly 108. In FIG. 7, main gear 406 remains stationary as end 112 of arm 110 pivots. As arm 110 pivots due to disengagement of latching mechanism 416, end 112 of arm 110 pivots away from a first retaining feature 702 in main gear 406 towards a second retaining feature 704 in main gear 406.

In response to deploying retractable propulsor assembly 108 via spring biasing system 418, latching mechanism 416 is activated to lock retractable propulsor assembly 108 in the deployed position by engaging latching mechanism 416 with second retaining feature 704. FIG. 8 illustrates retractable propulsor assembly 108 in the deployed position independent of primary deployment system 404 using spring biasing system 418 in an illustrative embodiment.

Figure 9:
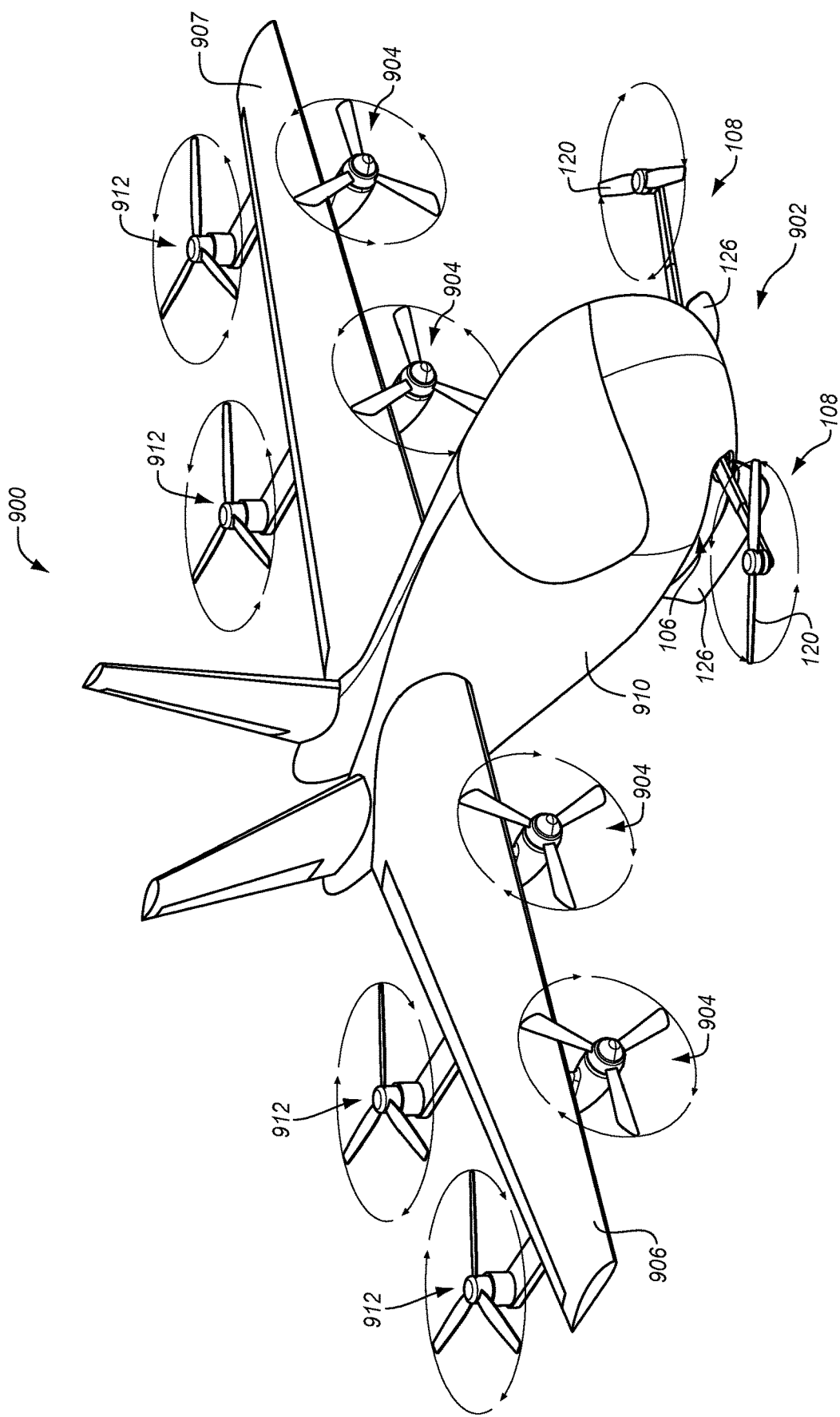
FIGS. 9-10 are isometric views of a VTOL aircraft in various illustrative embodiments.
Figure 10:
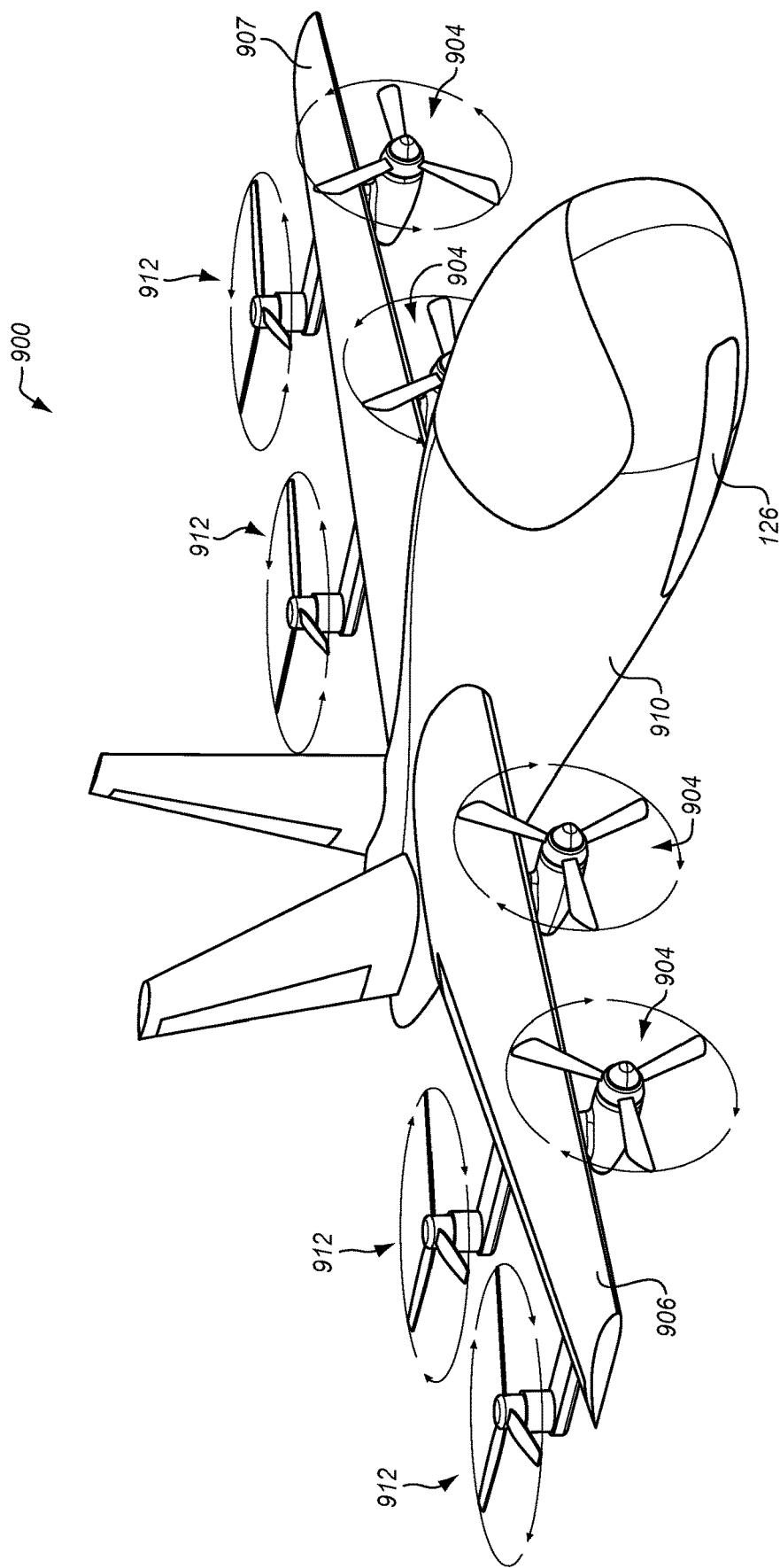

FIGS. 9-10 are perspective views of an aircraft 900 in various illustrative embodiments. The structure of aircraft 900 is merely provided as an example, and the concepts described herein for aircraft 900 apply to any aircraft. For example, aircraft 900 may comprise any type of air vehicle that utilizes retractable propulsor assemblies 108. Such air vehicles may include rotors that generate lift during forward flight (e.g., one type of flight control surface) and therefore, aircraft 900 in some embodiments does not include wings 906-907.

In this embodiment, aircraft 900 utilizes a pair of retractable propulsor assemblies 108, which are located proximate to a nose 902 of aircraft 900. In other embodiments, retractable propulsor assemblies 108 are located at other positions on aircraft 900. FIG. 9 illustrates retractable propulsor assemblies 108 for aircraft 900 in the deployed position, and FIG. 10 illustrates retractable propulsor assemblies 108 for aircraft 900 in the stowed position.

In this embodiment, aircraft 900 includes propulsors 904 that provide thrust for forward flight. Some examples of propulsors 904 include engines, motors, rotors, ducted fans, turbines, etc. Aircraft 900 also includes wings 906-907 extending from opposite sides of a fuselage 910 to define a support plane for horizontal, forward, wing-born flight, or cruise flight.

To provide vertical flight (i.e., vertical take-off, hover, and vertical landing), aircraft 900 includes one or more fixed propulsor assemblies 912, which are located aft of wings 906-907 in this embodiment, and retractable propulsor assemblies 108, which are forward of wings 906-907 and proximate to nose 902 in this embodiment. As aircraft 900 transitions from vertical flight to forward flight, retractable propulsor assemblies 108 are stowed within fuselage 910, and doors 126 are closed to allow aircraft 900 to achieve a more aerodynamic shape and reduce drag during forward flight (see FIG. 10).

Figure 11:
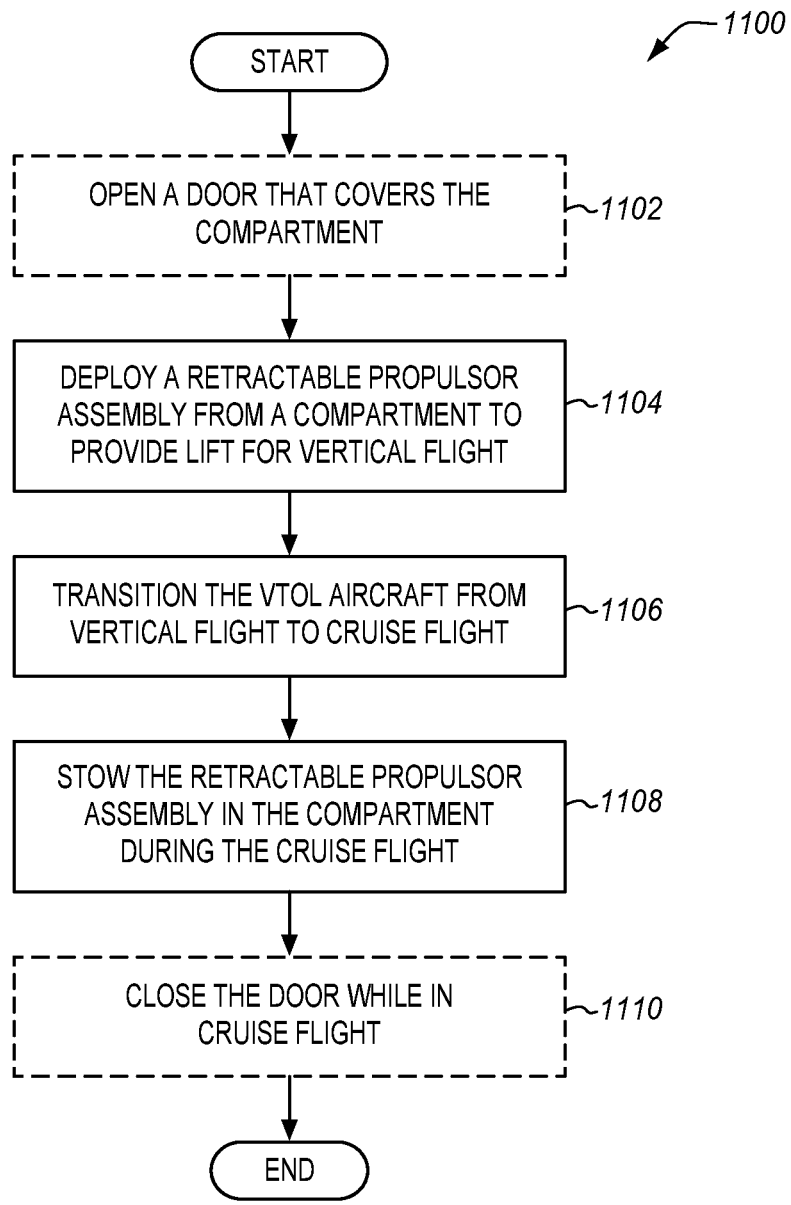
FIG. 11 is a flow chart of a method of operating a VTOL in an illustrative embodiment.
Figure 12:
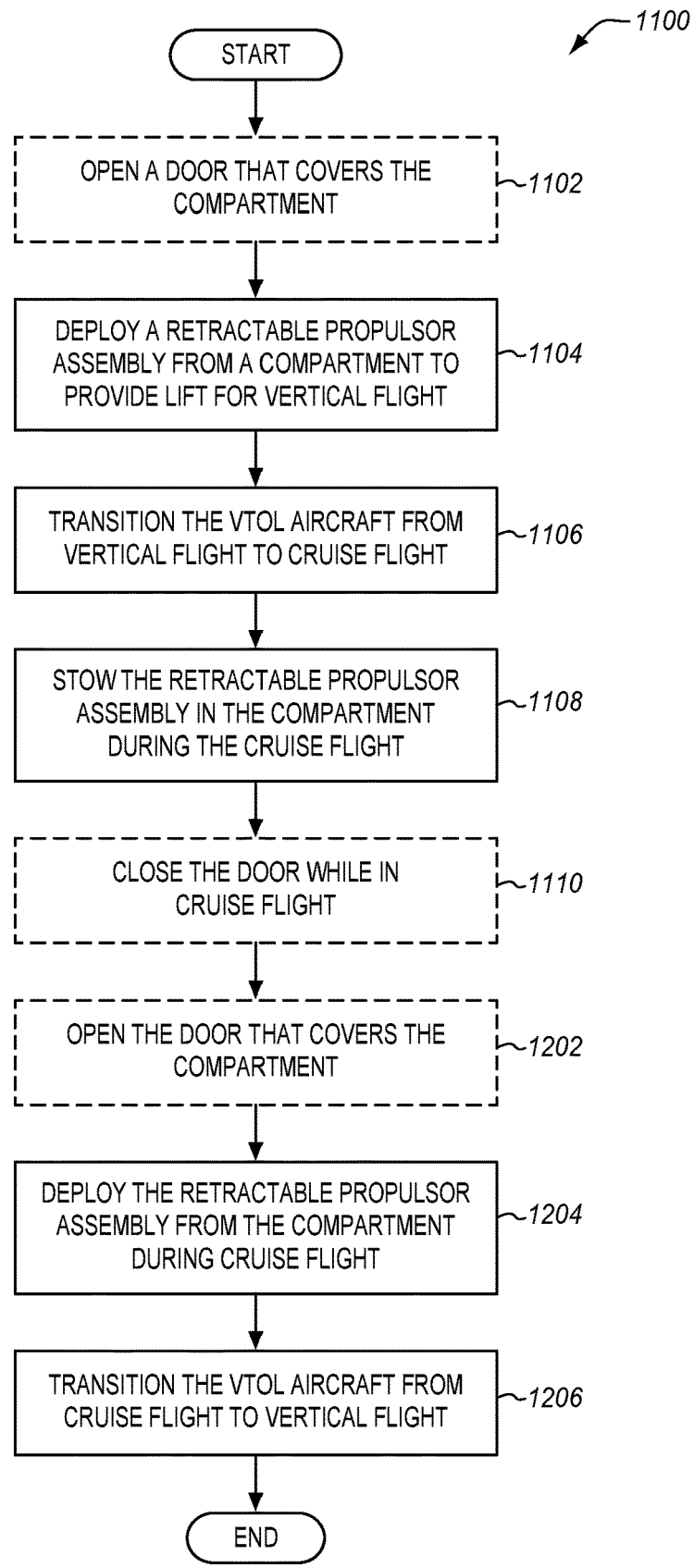
FIGS. 12-14 depict additional details of the method of FIG. 11 in various illustrative embodiments.
Figure 13:
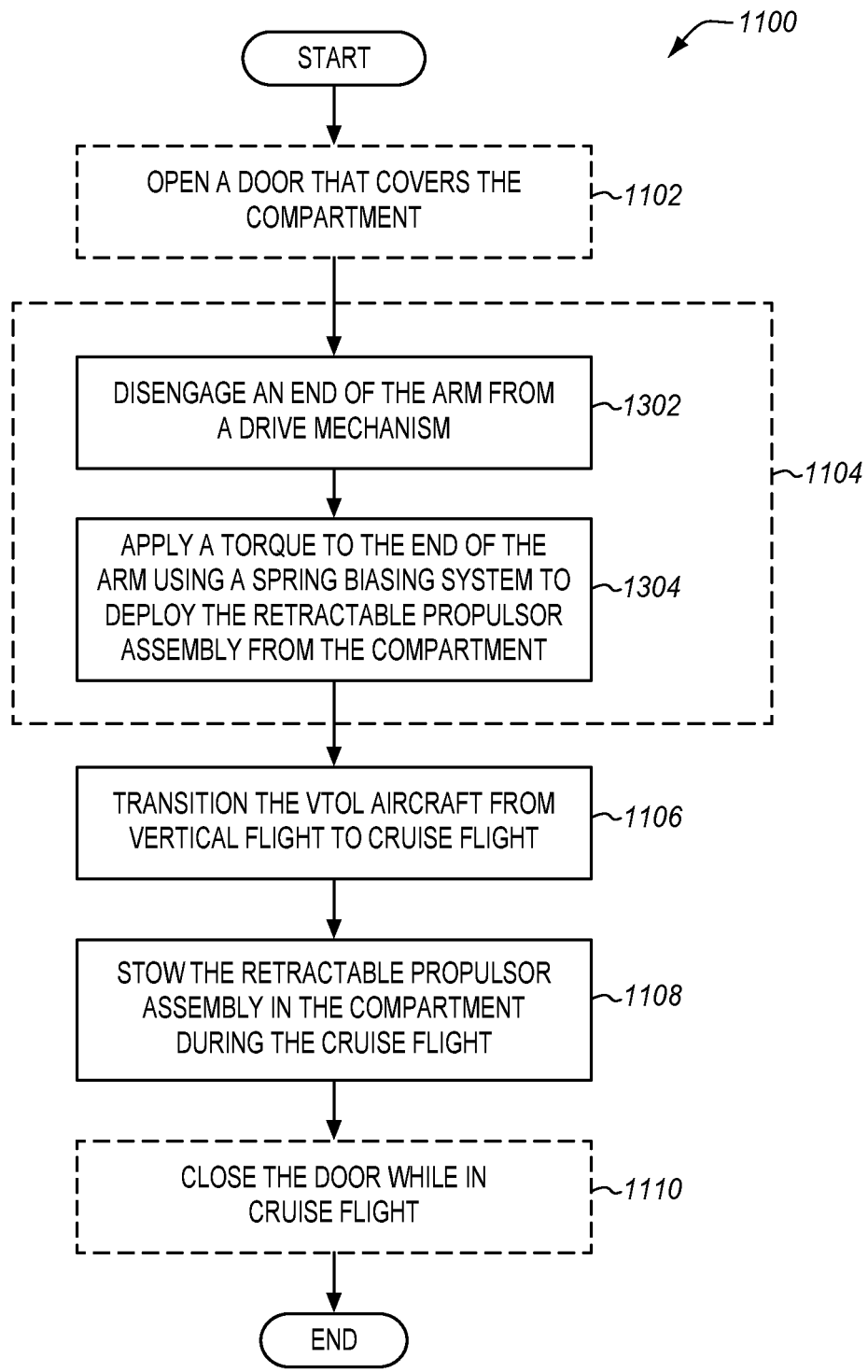

FIG. 11 is a flow chart of a method 1100 of operating a VTOL aircraft in an illustrative embodiment. FIGS. 12-13 are flow charts depicting additional details of method 1100 in various illustrative embodiments. Method 1100 will be described with respect to aircraft 900, although method 1100 may be performed by other aircraft. The steps of method 1100 are not all inclusive, and may include other steps, not shown. The steps may be performed in an alternate order.

Figure 14:
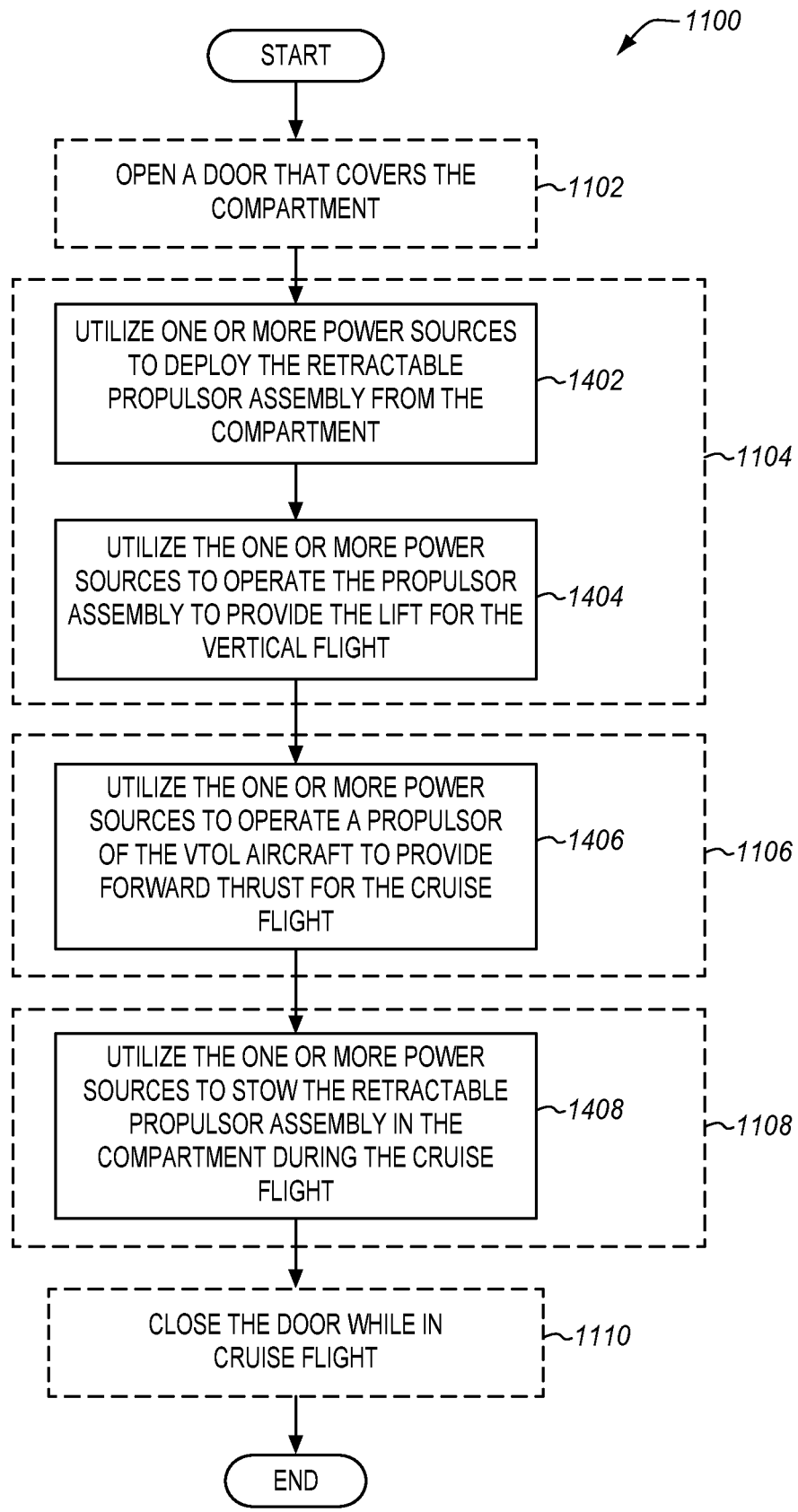

Prior to vertical take-off, doors 126 open (if equipped, see optional step 1102 and FIG. 9) and retractable propulsor assemblies 108 are deployed from compartments 106 (see step 1104). In some embodiments, deploying retractable propulsor assemblies 108 is performed utilizing one or more power sources (e.g., motors, engines, pneumatic pistons, springs, etc., see FIG. 14, step 1402). Lift for aircraft 900 is generated by retractable propulsor assemblies 108 and fixed propulsor assemblies 912 to perform vertical take-off. In some embodiments, one or more power sources are utilized to operate retractable propulsor assemblies 108 to provide lift (see FIG. 14, step 1404). Some examples of one or more power sources that may operate retractable propulsor assemblies 108 to provide lift include combinations of motors and rotors (e.g., motor 118 and rotor 120), ducted fans, turbines, engines, generators, batteries, hybrid power sources, etc.

As aircraft 900 achieves an altitude above the ground, propulsors 904 drive aircraft 900 forward and aircraft 900 transitions from vertical flight to cruise flight (see step 1106). In some embodiments, one or more power sources are utilized to operate propulsors 904 of aircraft 900 to provide forward thrust for cruise flight (see FIG. 14, step 1406).

When the lift generated by wings 906-907 is sufficient to maintain altitude, fixed propulsor assemblies 912 may be placed in a free-wheeling state. Retractable propulsor assemblies 108 are stowed in compartments 106 during cruise flight (see step 1108). For example, one or more power sources are utilized to stow retractable propulsor assemblies 108 in compartment 106 (see FIG. 14, step 1408). Doors 126, if present, close to cover compartments 106 while in cruise flight (see optional step 1110).

To transition out of cruise flight and into vertical flight, doors 126 open to uncover compartments 106 (see FIG. 12, optional step 1202), and retractable propulsor assemblies 108 are deployed from compartments 106 (see FIG. 12, step 1204). Fixed propulsor assemblies 912 are placed in operation and provide vertical lift. Rotors 120 of retractable propulsor assemblies 108 are driven in rotation and also provide vertical lift. Aircraft 900 transitions from cruise flight to vertical flight (see FIG. 12, step 1206).

In an embodiment, retractable propulsor assemblies 108 are deployed independently of primary deployment system 404 (e.g., primary deployment system 404 is inoperable). In this embodiment, end 112 of arm 110 (see FIG. 4) is disengaged from primary deployment system 404 (see FIG. 13, step 1302), and spring biasing system 418 applies a torque to end 112 to deploy retractable propulsor assembly 108 from compartment 106 (see FIG. 13, step 1304).

The use retractable propulsor assembly 108 allows aircraft 900 to take-off vertically, hover, and land vertically. When transitioning into cruise flight, retractable propulsor assemblies 108 are stowed, which minimizes drag on aircraft 900. When on the ground, retractable propulsor assemblies 108 may also be stowed to allow passengers to enter and exit aircraft 900 more easily. Further, various embodiments of retractable propulsor assemblies 108 are deployable using spring biasing system 418, which operates independently of primary deployment system 404. Further, still, selectively powering retractable propulsor assemblies 108 during vertical flight operations, while suspending such powering during forward or cruse flight improves the endurance of aircraft utilizing retractable propulsor assemblies 108 by reducing the electrical loads and/or fuel usage during forward or cruise flight.

Any of the various control aspects shown in the figures or described herein may be co-implemented along with any mechanical system described, as hardware, a processor implementing software, a processor implementing firmware, or some combination of these. For instance, the mechanical systems described herein for deploying and stowing retractable propulsor assemblies 108, in some embodiments, are controlled by one or more flight controllers, which may be implemented in combinations of hardware and software.

In another example, a control aspect may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control aspect may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. A method of operating a Vertical Take-Off and Landing (VTOL) aircraft, the method comprising:
   deploying a retractable propulsor assembly from a compartment of a fuselage of the VTOL aircraft to provide lift for vertical flight;
   transitioning the VTOL aircraft from the vertical flight to cruise flight; and
   stowing the retractable propulsor assembly in the compartment during the cruise flight to reduce aerodynamic drag on the VTOL aircraft;
   wherein the retractable propulsor assembly comprises:
      an arm having a first end rotatably coupled to the fuselage;
      a propulsor disposed at a second end of the arm that is configured to generate lift for the aircraft;
      a drive mechanism configured to pivot the arm relative to the fuselage to transition the retractable propulsor assembly between a stowed position where the retractable propulsor assembly is stowed in the compartment, and a deployed position where the retractable propulsor assembly is deployed to perform vertical flight;
      a latching mechanism configured to selectively engage the arm with the drive mechanism, and disengage the arm from the drive mechanism; and
      a spring biasing system mechanically coupled to the first end of the arm;
   wherein deploying the retractable propulsor assembly further comprises:
      operating the latching mechanism to disengage the arm from the drive mechanism upon failure of the drive mechanism; and
      applying torque to the first end of the arm with the spring biasing system to pivot the arm out of the compartment and into the deployed position independently of the drive mechanism.

2. The method of claim 1, further comprising:
   deploying the retractable propulsor assembly from the compartment during the cruise flight; and
   transitioning the VTOL aircraft from the cruise flight to the vertical flight.

3. The method of claim 1, further comprising:
   opening a door that covers the compartment prior to deploying the retractable propulsor assembly.

4. The method of claim 3, further comprising:
   closing the door that covers the compartment while in cruise flight.

5. An aircraft, comprising:
   a fuselage having control surfaces that are configured to provide lift during forward flight; and
   a retractable propulsor assembly, comprising:
      an arm having a first end rotatably coupled to the fuselage;
      a propulsor disposed at a second end of the arm that is configured to generate lift for the aircraft;
      a drive mechanism mechanically coupled to the first end of the arm that is configured to pivot the arm out of a compartment in the fuselage to transition the aircraft into vertical flight, and to pivot the arm into the compartment in response to the aircraft being in forward flight;
      a latching mechanism configured to selectively engage the arm with the drive mechanism, and disengage the arm from the drive mechanism; and
      a spring biasing system that operates independently of the drive mechanism to deploy the retractable propulsor assembly upon failure of the drive mechanism, the spring biasing system is mechanically coupled to the first end of the arm and is configured, in response to operating the latching mechanism to disengage the arm from the drive mechanism, to apply a torque to the first end of the arm to pivot the arm out of the compartment and into a deployed position.

6. The aircraft of claim 5, wherein the drive mechanism comprises:
   a main gear engaged with a driving gear;
   the main gear is mechanically coupled to the first end of the arm;
   the driving gear is driven in rotation to pivot the arm out of the compartment and into the deployed position.

7. The aircraft of claim 6, wherein:
   the arm is rotatably coupled to the main gear, and is held in place relative to the main gear by the latching mechanism;
   the second end of the arm, upon disengagement of the latching mechanism, pivots away from a first retaining feature in the main gear towards a second retaining feature in the main gear due to the torque applied by the spring biasing system; and the latching mechanism is configured to engage the second retaining feature in the main gear to lock the retractable propulsor assembly in the deployed position.

8. The aircraft of claim 5, further comprising:

a door configured to selectively cover and uncover the compartment.

9. The aircraft of claim 8, wherein:

the door is configured to cover the compartment in response to pivoting the retractable propulsor assembly into the compartment, and to uncover the compartment prior to pivoting the retractable propulsor assembly out of the compartment.

10. The aircraft of claim 5, further comprising:

landing gear disposed on the arm that is configured to support the fuselage when the aircraft is on ground.

11. The aircraft of claim 5, wherein:

the compartment in the fuselage is proximate to a nose of the aircraft.

12. The aircraft of claim 5, wherein:

the retractable propulsor assembly comprises one of a plurality of retractable propulsor assemblies, each configured to generate a portion of the lift for the aircraft.

13. The aircraft of claim 12, wherein:

the control surfaces comprise wings of the aircraft; and the plurality of retractable propulsor assemblies is disposed forward of the wings.

14. A retractable propulsor assembly for aircraft, comprising:

an arm having a first end rotatably coupled to a fuselage of the aircraft;

a propulsor disposed at a second end of the arm that is configured to generate lift for the aircraft;

a drive mechanism configured to pivot the arm relative to the fuselage to transition the retractable propulsor assembly between a stowed position where the retractable propulsor assembly is stowed in a compartment of the aircraft, and a deployed position where the retractable propulsor assembly is deployed to perform vertical flight operations;

a locking mechanism configured to selectively engage the arm with the drive mechanism, and disengage the arm from the drive mechanism; and a spring biasing system that operates independently of the drive mechanism to deploy the retractable propulsor assembly upon failure of the drive mechanism, the spring biasing system is mechanically coupled to the first end of the arm and is configured, in response to operating the locking mechanism to disengage the arm from the drive mechanism, to apply a torque to the first end of the arm to pivot the arm out of the compartment and into the deployed position.

15. The retractable propulsor assembly of claim 14, wherein:

the propulsor comprises a motor mechanically coupled to at least one rotor.

16. The retractable propulsor assembly of claim 14, wherein:

the locking mechanism comprises a locking pin.

17. The retractable propulsor assembly of claim 14, further comprising:

landing gear disposed on the arm that is configured to support the fuselage when the aircraft is on ground.

18. The retractable propulsor assembly of claim 14, wherein the drive mechanism further comprises:

a main gear engaged with a driving gear;

the main gear is mechanically coupled to the first end of the arm;

the driving gear is driven in rotation to pivot the arm out of the compartment and into the deployed position.

19. The retractable propulsor assembly of claim 18, wherein:

the arm is rotatably coupled to the main gear, and is held in place relative to the main gear by the locking mechanism;

the second end of the arm, upon disengagement of the locking mechanism, pivots away from a first retaining feature in the main gear towards a second retaining feature in the main gear due to the torque applied by the spring biasing system; and the locking mechanism is configured to engage the second retaining feature in the main gear to lock the retractable propulsor assembly in the deployed position.

20. The retractable propulsor assembly of claim 14, wherein:

the retractable propulsor assembly is proximate to a nose of the aircraft.

* * * * *